United States Patent [19]

Rochat et al.

[11] Patent Number: 4,782,153
[45] Date of Patent: Nov. 1, 1988

[54] PYRIDOQUINOLONE DERIVATIVES

[75] Inventors: Alain C. Rochat, Fribourg; Abul Iqbal, Arconciel, both of Switzerland; Edward E. Jaffe, Wilmington, Del.

[73] Assignee: Ciba-Geigy Corporation, Ardsley, N.Y.

[21] Appl. No.: 122,144

[22] Filed: Nov. 17, 1987

Related U.S. Application Data

[63] Continuation-in-part of Ser. No. 920,624, Oct. 20, 1986, Pat. No. 4,730,014.

[51] Int. Cl.$^4$ .............................. C07D 471/04
[52] U.S. Cl. ............................ 546/81; 544/215; 544/405
[58] Field of Search .................. 546/81; 544/215, 405

[56] References Cited

PUBLICATIONS

Sillion, B., et al., *J. Polym. Sci.*, Part C 1965 (pub 1969), No. 16, (PT. 8), 4653–67.

*Primary Examiner*—Richard A. Schwartz
*Attorney, Agent, or Firm*—Harry Falber

[57] ABSTRACT

Process for mass-coloring high molecular weight organic material, which comprises using a compound of the formula I

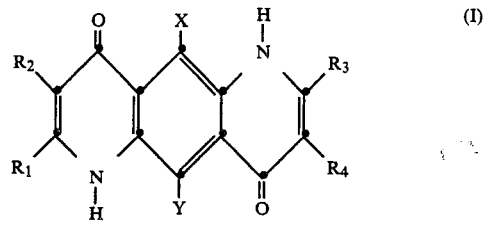

in which one of $R_1$ and $R_2$ and one of $R_3$ and $R_4$ are, independently of each other, hydrogen, $C_1$–$C_{12}$-alkyl or benzyl and the other two radicals are, independently of each other, unsubstituted or halogen-, trifluoromethyl-, cyano-, $C_1$–$C_{12}$-alkyl-, —$OR_5$-, —$SR_5$-, —$COR_6$- or —$SO_2R_6$-substituted phenyl, biphenyl or naphthyl or a 5- or 6-membered aromatic heterocyclic ring containing one or more identical or different hetero atoms selected from the group consisting of nitrogen, oxygen and sulfur without or with one or two fused-on benzene rings, $R_5$ is hydrogen or $C_1$–$C_{12}$-alkyl, $R_6$ is $C_1$–$C_{12}$-alkyl, and X and Y are independently of each other hydrogen, halogen or cyano.

The invention also relates to new pyridoquinolones of the formula I.

The colorings obtained with (I) have a yellow hue, a very high tinctorial strength which does not significantly change even in the event of prolonged processing and residence times, high saturation, high dispersibility, good overpainting, migration, wet, rub, light and weather resistance and in particular excellent heat stability.

4 Claims, No Drawings

PYRIDOQUINOLONE DERIVATIVES

CROSS REFERENCE

This is a continuation-in-part of our application Ser. No. 920,624 filed Oct. 20, 1986, now U.S. Pat. No. 4,730,014.

The present invention relates to the colouring of high molecular weight organic material with diaryl- or dihetaryl-pyrido-[2,3-g]-quinoline-4,9-diones and to novel di-aryl- or A process for preparing the pyridoquinolone of the formula

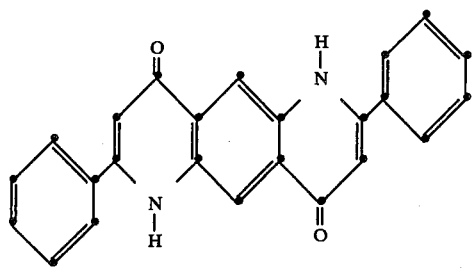

was described as long ago as 1969 by B. Sillion and G. De Gaudemaris in J. Polymer Science (C) 16, 4653–4667. Only now has it become clear that pyridoquinolones of this kind are, surprisingly, very highly suitable for colouring high molecular weight organic material.

The present invention accordingly provides a process for mass-colouring high molecular weight organic material, which comprises using a compound of the formula I

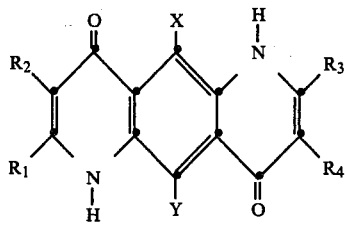

in which one of $R_1$ and $R_2$ and one of $R_3$ and $R_4$ are, independently of each other, hydrogen, $C_1$–$C_{12}$-alkyl or benzyl and the other two radicals are, independently of each other, unsubstituted or halogen-, trifluoromethyl-, cyano-, $C_1$–$C_{12}$-alkyl-, —$OR_5$-, —$SR_5$-, —$COR_6$- or —$SO_2R_6$- substituted phenyl, biphenyl or naphthyl or a 5- or 6-membered aromatic heterocyclic ring containing one or more identical or different heteroatoms selected from the group consisting of nitrogen, oxygen and sulfur without or with one or two fused-on benzene rings, $R_5$ is hydrogen or $C_1$–$C_{12}$-alkyl, $R_6$ is $C_1$–$C_{12}$-alkyl, and X and Y are independently of each other hydrogen, halogen or cyano.

Any $C_1$–$C_{12}$-alkyl substituents are for example, methyl, ethyl, n-propyl, isopropyl, n-butyl, sec-butyl or tert-butyl, n-pentyl, tert-pentyl, neopentyl, hexyl, heptyl, octyl, nonyl, decyl, dodecyl.

Halogen is for example bromine, fluorine or preferably chlorine.

Aromatic heterocyclic rings $R_1$ to $R_4$ are for example pyridyl, pyrimidyl, pyrazinyl, triazinyl, furyl, pyrrolyl, thienyl, quinolyl, coumarinyl, benzofuranyl, benzimidazolyl, benzoxazolyl, dibenzofuranyl, benzothienyl, dibenzothienyl, indolyl, carbazolyl, pyrazolyl, imidazolyl, oxazolyl, isoxazolyl, thiazolyl, indazolyl, benzothiazolyl, pyridazinyl, quinnolinyl, quinazolinyl, quinoxalinyl, phthalazinyl, phthalazindionyl, phthalimidyl, chromonyl, naphtholacetamyl, quinolonyl, maleimidyl, naphthyridinyl, benzimidazolonyl, benzoxazolonyl, benzothiazolonyl, benzothiazothionyl, quinazolonyl, quinoxalonyl, phthalazonyl, dioxopyrimidinyl, pyridonyl, isoquinolonyl, isoquinolinyl, isothiazolyl, benzoisoxazolyl, benzoisothiazolyl, indazolonyl, acridinyl, acridonyl, quinazolinedionyl, quinoxalinedionyl, benzoxazinedionyl, benzoxazinonyl and naphthalimidyl.

Of particular interest is the use of compounds of the formula I in which one of $R_1$ and $R_2$ and one of $R_3$ and $R_4$ are hydrogen and the other two radicals are, independently of each other, unsubstituted or $C_1$–$C_{12}$-alkyl- or $C_1$–$C_{12}$-alkoxy-substituted phenyl, biphenyl or naphthyl, or a heterocyclic radical selected from the group consisting of pyridyl, pyrazinyl, triazinyl, furyl, pyrrolyl, thienyl, quinolyl, coumarinyl, indolyl, benzofuranyl, benzimidazolyl and benzoxazolyl.

Of very particular interest is the use of compounds of the formula I in which one of $R_1$ and $R_2$ and one of $R_3$ and $R_4$ are hydrogen and the other two radicals are, independently of each other, p-biphenyl, β-naphthyl, unsubstituted or $C_1$–$C_4$-alkyl-substituted phenyl, and X and Y are hydrogen.

Preference is given to the use of compounds of the formula I in which $R_2$ and $R_4$ are hydrogen.

Particular preference is given to the use of compounds of the formula I in which $R_2$ and $R_4$ are hydrogen, $R_1$ and $R_3$ are identical and are p-biphenyl, β-naphthyl, unsubstituted or $C_1$–$C_4$-alkyl-substituted phenyl, and X and Y are hydrogen.

The pyridoquinolones of the formula I can be prepared by reacting a 2,5-diaminoterephthalic acid or ester thereof of the formula II

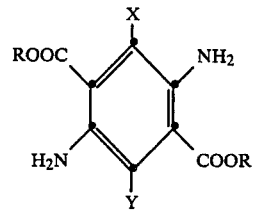

in which R is hydrogen or $C_1$–$C_{12}$-alkyl (for example methyl or ethyl), and X and Y are as defined above, with a ketone each of the formulae III and IV

or a ketal each of the formulae V and VI

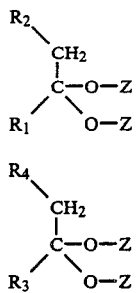

$$\begin{array}{c} R_2 \\ \phantom{x}\diagdown \\ \phantom{xx}CH_2 \\ \phantom{xxx}| \\ \phantom{xx}C-O-Z \\ \phantom{x}\diagup\phantom{xx}\diagdown \\ R_1\phantom{xxxx}O-Z \end{array} \quad (V)$$

$$\begin{array}{c} R_4 \\ \phantom{x}\diagdown \\ \phantom{xx}CH_2 \\ \phantom{xxx}| \\ \phantom{xx}C-O-Z \\ \phantom{x}\diagup\phantom{xx}\diagdown \\ R_3\phantom{xxxx}O-Z \end{array} \quad (VI)$$

or with a mixture of a ketone of the formula III and a ketal of the formula VI in which $R_1$, $R_2$, $R_3$ and $R_4$ are as defined above and Z is $C_1$–$C_4$-alkyl or the two Zs together are $C_1$–$C_4$-alkylene, for example ethylene, propylene or butylene, in a molar ratio of 1:1:1 by methods known per se.

The compounds of the formulae II to VI are known compounds. If any of them should still be new, they can be prepared analogously to known methods.

If instead of the ketal (normally a dioxolane derivative) the corresponding free aromatic ketone is reacted with the diamine(II), the condensation is expediently carried out in the presence of an acid catalyst (for example sulfuric acid, toluene-4-sulfonic acid, benzoic acid, 2-ethylcaproic acid, etc. or even Lewis acids, for example $AlCl_3$, $ZnCl_2$, $CaCl_2$ etc.).

As already mentioned at the beginning, the pyridoquinolone of the formula I in which $R_1$ and $R_2$ are phenyl and $R_3$, $R_4$, X and Y are hydrogen is known. The remaining pyridoquinolones of the formula I are new.

The invention further provides the compounds of the formula VII

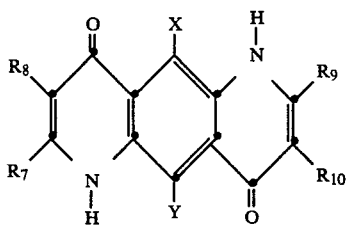

(VII)

in which one of $R_7$ and $R_8$ and one of $R_9$ and $R_{10}$ are, independently of each other, hydrogen, $C_1$–$C_{12}$-alkyl or benzyl and the other two radicals are, independently of each other, unsubstituted biphenyl or naphthyl or halogen-, trifluoro-methyl-, cyano-, $C_1$–$C_{12}$-alkyl-, —$OR_5$-, —$SR_5$-, —$COR_6$—$SO_2R_6$-substituted phenyl, biphenyl or naphthyl or a 5- or 6-membered aromatic heterocyclic ring which contains one or more identical or different hetero atoms selected from the group comprising nitrogen, oxygen and sulfur without or with one or two fused-on benzene rings, and $R_5$, $R_6$, X and Y are as defined above.

Halogen is for example bromine, fluorine and in particular chlorine.

Aromatic heterocyclic rings $R_7$ to $R_{10}$ are defined in the same way as $R_1$ to $R_4$ above.

Particular interest is given to compounds of the formula VII in which one of $R_7$ and $R_8$ and one of $R_9$ and $R_{10}$ are hydrogen and the other two radicals are, independently of each other, unsubstituted biphenyl or naphthyl, $C_1$–$C_{12}$-alkyl-, or $C_1$–$C_{12}$-alkoxy-substituted phenyl, biphenyl or naphthyl or a heterocyclic radical selected from the group consisting of pyridyl, pyrazinyl, triazinyl, furyl, pyrrolyl, thienyl, quinolyl, coumarinyl, indolyl, benzofuranyl, benzimidazolyl and benzoxazolyl.

Preference is given to compounds of the formula VII in which one of $R_7$ and $R_8$ and one of $R_9$ and $R_{10}$ are hydrogen and the other two radicals are, independently of each other, p-biphenyl or β-naphthyl or $C_1$–$C_4$-alkyl-substituted phenyl and X and Y are hydrogen.

Particular preference is given to compounds of the formula VII in which $R_8$ and $R_{10}$ are hydrogen.

Very particular preference is given to compounds of the formula VII in which $R_8$ and $R_{10}$ are hydrogen, $R_7$ and $R_9$ are equal and are p-biphenyl, β-naphthyl and $C_1$–$C_4$-alkyl-substituted phenyl and X and Y are hydrogen.

Owing to their extremely low solubility and their extremely high heat stability, the compounds of the formula I are highly suitable for use as pigments. For this use it is advantageous to convert the crude products obtained in the synthesis into an optimal pigmentary form, for example by reprecipitating and recrystallizing or by solvent conditioning or by milling and subsequent conditioning. This can be effected for example as follows:

(a) by milling or kneading, expediently in the presence of milling assistants, such as inorganic or organic salts with or without the presence of organic solvents. After the milling, the assistants are removed in conventional manner: soluble inorganic salts for example with water and waterinsoluble organic solvents for example by steam distillation, (b) by reprecipitating from concentrated acids, for example sulfuric acid, methanesulfonic acid, toluenesulfonic acid, trichloroacetic acid or polyphosphoric acid or mixtures thereof, (c) converting the crude pigment into alkali metal or amine salt and hydrolyzing the latter. This is effected for example by stirring the crude pigment with a base, for example with an alkali metal hydroxide or alcoholate, ammonia or an amine in a polar organic solvent, such as dimethylformamide, during which the pigment goes wholly or partly into solution. By hydrolysis, preferably by acidifing the filtered or unfiltered solution, the pigment is precipitated.

In every case a recrystallization is advisable, preferably by aftertreating the crude pigments obtained in the synthesis with organic solvents, in particular with those which boil above 100° C.

Suitable solvents are for example benzenes which are substituted by halogen atoms or alkyl or nitro groups, such as xylenes, chlorobenzene, o-dichlorobenzene or nitrobenzene, and also pyridine bases, such as pyridine, picoline or quinoline, furthermore ketones, such as cyclohexanone, ethers such as ethylene glycol monomethyl or monoethyl ether, amides, such as dimethylformamide or N-methylpyrrolidone, and also dimethyl sulfoxide and sulfolane. The aftertreatment can also be carried out in water alone or in an aqueous acid, for example hydrochloric acid, sulfuric acid or phosphoric acid, in the presence or absence of organic solvents and/or in the presence of surface-active substances. These processes can also take place under pressure.

A particularly suitable method is the reprecipitation with concentrated acids, such as sulfuric acid, with subsequent conditioning of the water-precipitated pigment, by heating at high temperatures (100°–200° C.), under atmospheric or superatmospheric pressure.

Depending on the intended use, it is advantageous to use the pigments as toners or in the form of formulations.

The high molecular weight organic material to be coloured with the pyridoquinolones of the formula I can be of natural or artificial origin. The material in question can be for example natural resins or drying oils, rubber or casein or modified natural substances, such as chlororubber, oil-modified alkyd resins, viscose, cellulose ethers or esters, such as cellulose acetate, cellulose propionate, cellulose acetobutyrate or nitrocellulose, but in particular wholly synthetic organic polymers (thermosets and thermoplastics) as obtained by polymerization, polycondensation or polyaddition. Prime examples from the class of the polymerization resins are: polyolefines, such as polyethylene, polypropylene or polyisobutylene, substituted polyolefines, such as polymers of vinyl chloride, vinyl acetate, styrene, acrylonitrile, acrylates and/or methacrylates or butadiene, and also copolymers of the monomers mentioned, in particular ABS or EVA.

Examples from the series of the polyaddition and polycondensation resins are the condensation products of formaldehyde with phenols, the so-called phenolic resins, and the condensation products of formaldehyde with urea, thiourea and melamine, the so-called amino resins, the polyesters used as varnish resins, including not only saturated polyesters, for example alkyd resins, but also unsaturated polyesters, for example maleate resins, and also the linear polyesters and polyamides or silicones.

The high molecular weight compounds mentioned can be present individually or in mixtures as plastic materials or melts which, if desired, can be spun to form fibres.

They can also be present in the form of their monomers or in the polymerized state in dissolved or suspended form as film formers or binders for varnishes, paints or printing inks, for example linseed oil varnish, nitrocellulose, alkyd resins, melamine resins and urea-formaldehyde resins or acrylic resins.

The pyridoquinolones of the formula I are very particularly suitable for pigmenting thermoplastics, for example polystyrene, ABS, rubber, polyamides, polycarbonates, linear polyesters and in particular polyolefines, preferably polyethylene and in particular polypropylene. Of great interest is also the pigmenting of engineering plastics.

The high molecular weight organic substances are pigmented with the pyridoquinolones of the formula I for example by admixing such pigment as a toner or preferably in the form of formulations or masterbatches to these substrates by means of roll mills or mixing or milling apparatuses. The pigmented material is then brought to the desired final form by methods known per se, such as calendering, pressing, extruding, brushing, casting, injection moulding or spinning. To prepare non-rigid mouldings or to reduce their brittleness, it is frequently desirable to incorporate plasticizers into the high molecular weight compounds before the moulding. These plasticizers can be for example esters of phosphoric acid, phthalic acid or sebacic acid. The plasticizers can be incorporated in the process according to the invention into the polymers before or after incorporating the pigment dye or in a mixture therewith. It is further possible, for the purpose of obtaining different hues, to add to the high molecular weight organic substances in addition to the pyridoquinolones of the formula I also fillers or other colouring constituents, such as white, coloured or black pigments, in any desired amounts.

To pigment varnishes, paints and printing inks, the high molecular weight organic materials and the pyridoquinolones of the formula I, if desired together with additives, such as fillers, other pigments, siccatives or plasticizers, are finely dispersed or dissolved in an organic solvent or solvent mixture. This can be done by dispersing or dissolving the individual components separately or a number of them together, and only then combining all the components. If desired, the pyridoquinolones of the formula I can as already mentioned be subjected beforehand to a milling and mixing process and subsequent recrystallization.

Based on the high molecular weight organic material to be pigmented, the pyridoquinolones of the formula I are used in an amount of for example 0.01 to 30% by weight, preferably 0.1 to 10% by weight.

In colorations, for example in plastics, fibres, paints or prints, the pyridoquinolones of the formula I have a yellow hue, a high tinctorial strength which does not change significantly even in the event of prolonged processing and residence times, high saturation, high dispersibility, good overcoating, migration, wet, rub, light and weather stability and in particular an excellent heat stability. In addition they confer upon the colorations prepared therefrom an excellent lustre and impair the mechanical strengths of the coloured substrates only to a small extent, if at all.

Of particular interest is the mass-colouring of thermoplastics.

In the examples below, the parts and percentages are by weight, unless otherwise stated.

EXAMPLE 1

A 500 ml sulfonation flask equipped with propeller stirrer, thermometer and descending condenser for the distillation of volatile reactants is charged while flushing with nitrogen with 25.74 g of diethyl 2,5-diaminoterephthalate, 57.95 g of 2-methyl-2-phenyl-1,3-dioxolane and 350 ml of diphenyl ether. The suspension obtained is dipped into a preheated Woods metal bath and is heated in stages to 246° C., while about 15 ml of a yellowish liquid are distilled off. After 1½ to 2 hours the desired reaction temperature of at least 240° C. is reached, when the distillation can be discontinued and switched to refluxing. A short time later the product formed begins to crystallize out. The mixture is refluxed at 240° C. for about 20 hours, cooled down to about 90° C. and finally filtered through a suction filter. The luminous product is washed in succession with about 500 ml of hot o-dichlorobenzene, 500 ml of ethanol and 1 liter of hot water, each until the filtrate running off is colourless. The water-moist product is dried at about 100° C. in a vacuum drying cabinet. This leaves 27.9 g of a compound of the formula

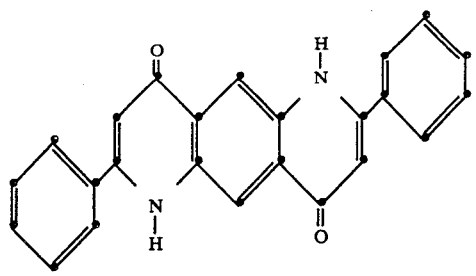

as a brownish yellow sandy powder (76.6% of theory).

EXAMPLES 2-10

Example 1 is repeated using equivalent amounts of the corresponding dioxolanes in place of 2-methyl-2-phenyl-1,3-dioxolane and the products listed in the table below under the formula

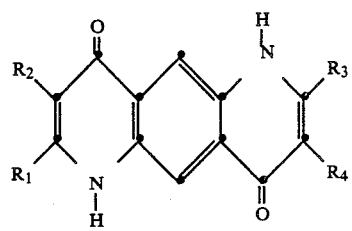

are obtained.

| Example No. | $R_1 = R_3$ | $R_2 = R_4$ | Yield % of theory | Hue in PVC (0.2% by weight of pigment) |
|---|---|---|---|---|
| 2 | phenyl | $CH_3-$ | 64.2 | pale yellow |
| 3 | 3-methylphenyl | H | 70.1 | deep bright yellow |
| 4 | 3-chlorophenyl | H | 70.1 | greenish yellow |
| 5 | 3-methoxyphenyl | H | 74.0 | greenish yellow |
| 6 | biphenyl | H | 55.4 | yellowish orange |
| 7 | 3-acetylphenyl | H | 83.9 | yellowish orange |
| 8 | 4-methylphenyl | H | 57.2 | greenish yellow |
| 9 | 3,4-dimethylphenyl | H | 82.3 | greenish yellow |

| Example No. | $R_1 = R_3$ | $R_2 = R_4$ | Yield % of theory | Hue in PVC (0.2% by weight of pigment) |
| --- | --- | --- | --- | --- |
| 10 | 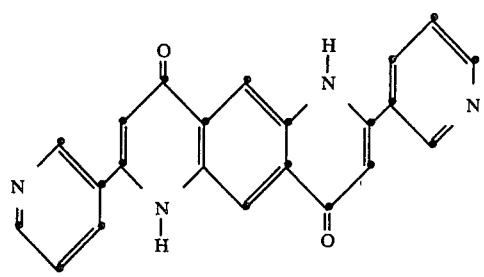 | H | 80.3 | slightly greenish yellow |

EXAMPLE 11

13.2 g of the pigment of Example 3 are dissolved at room temperature in 264 ml of 96% sulfuric acid. The soslution obtained is then introduced into a dropping funnel and metered into 2300 ml of ice-water; in the course of the addition the internal temperature rises from 2° to 26° C. The dropping funnel is rinsed out with a little water, and the pigment suspension is then heated to 95° C. (reflux) and maintained at that temperature for 18.5 hours. After cooling down to about 70° C., the suspension is filtered and is washed with hot water until neutral. Drying in a vacuum oven at about 80° C. leaves 12.93 g of recrystallized pigment. This product (12.5 g) is substantially suspended in N-methylpyrrolidone (190 ml), and the mixture is heated to 180° C. After 17 hours at that temperature the pigment is filtered at 80° C. and is thoroughly washed in succession with dimethylformamide, methanol and water. Drying at 120° C. in vacuo leave 12.2 g of a hiding pigment grade.

EXAMPLE 12

3.09 g of diethyl 2,5-diaminoterephthalate, 4.87 g of 3-acetylindole and 4.41 g of 2-ethylcaproic acid are introduced together with 30 ml of diphenyl ether into a sulfonation flask. The mixture is then heated to about 160° C. and is held at that temperature for about 3 hours; this is followed by further heating to 202° C., during which the volatile reactants are distilled off, stirring at 202° C. for 22 hours and cooling down to about 100° C. The product obtained is filtered off and washed in succession with warm odichlorobenzene, with dimethylformamide and methanol and finally with hot water. Drying in a vacuum oven at about 80° C. leaves 4.35 g of the compound of the formula

EXAMPLE 13

The same condensation reaction as in Example 12 is carried out with 3-acetylpyridine in place of 3-acetylindole, affording the product of the formula as a yellow powder in a yield of 84.4% of theory.

EXAMPLE 14

The same condensation reaction as in Example 12 is carried out with 4-hydroxyacetophenone in place of 3-acetylindole, affording the product of the formula

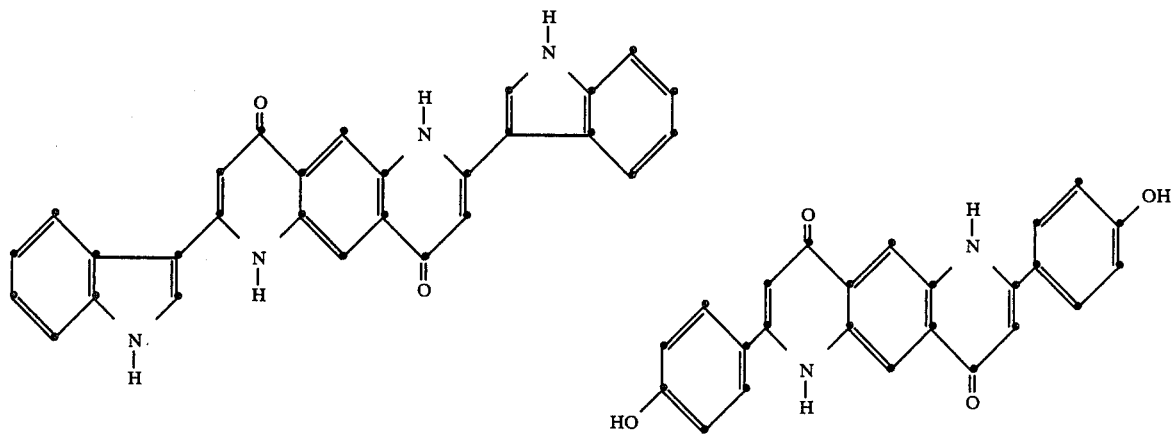

as a yellow powder, which corresponds to a yield of 82% of theory.

as a yellow powder in a yield of 89.7% of theory.

EXAMPLE 15

The same condensation reaction as in Example 12 with 4-cyanoacetophenone in place of 3-acetylindole affords the product of the formula

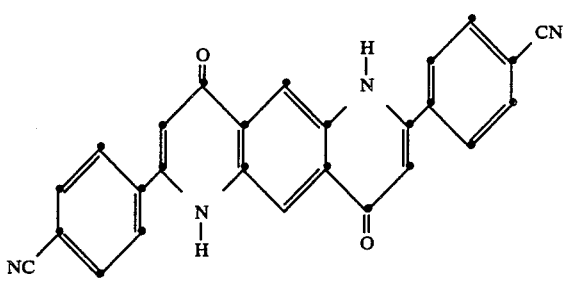

as a yellow powder in a yield of 38.6% of theory.

EXAMPLE 16

The same condensation reaction as in Example 12 with 3-trifluoromethylacetophenone in place of 3-acetylindole affords the product of the formula

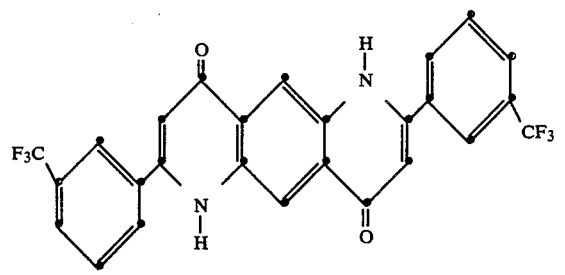

as a yellow powder in a yield of 28.4% of theory.

EXAMPLE 17

The compound of Example 1 can also be obtained by the following method:

A mixture consisting of 2.57 g of diethyl 2,5-diaminoterephthalate, 15 ml of acetophenone and 0.28 g of anhydrous zinc chloride is heated under nitrogen to 170° C. and maintained at that temperature for 3 hours. The temperature is then raised to 180°–185° C. and is maintained at that level for 13 hours, during which the volatiles are distilled off continuously. The reaction mixture is then cooled down to 80° C. and filtered. The residue is thoroughly washed with, in succession, dimethylformamide and methanol and is dried at 80° C. in a vacuum drying cabinet. 3.29 g of a brownish yellow product are obtained (90.4% of theory).

EXAMPLE 18

2.57 g of diethyl 2,5-diaminoterephthalate, 5.21 g of methyl 2-naphthyl ketone and 0.28 g of anhydrous zinc chloride are mixed together with 15 ml of N-methylpyrrolidone under nitrogen. The mixture is first heated to 170° C., and the solution obtained is maintained at that temperature for 3 hours, during which the yellow pigment begins to precipitate. The temperature is then raised to 180°–185° C. and maintained at that level until the reaction is ended (for a maximum of 24 hours), while the volatiles are distilled off continuously. The pigment suspension is then cooled down to 110° C., diluted with 15 ml of dimethylformamide and filtered, and the residue is washed in succession with sufficient amounts of dimethylformamide, methanol and hot water and is dried at 80° C. in a vacuum drying cabinet. This leaves 3.48 g of a bright yellow pigment of the formula

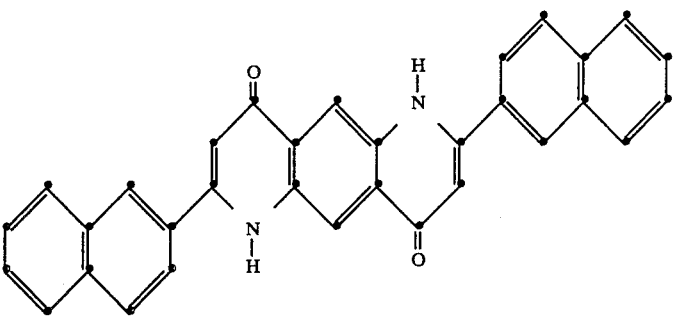

having excellent heat fastness properties.

EXAMPLE 19

A mixture consisting of 2.55 g of diethyl 2,5-diaminoterephthalate, 1.75 g of 4-chloroacetophenone, 3.28 g of 100% 2-methyl-2-phenyl-1,3-dioxolane, 0.24 g of benzoic acid and 50 ml of diphenyl ether is introduced into a small (100 ml) sulfonation flask under nitrogen and heated at as uniform a rate as possible to 200° C. in the course of 6 hours. At that temperature the pigment starts to precipitate. The temperature is then raised to 240°–245° C. and is maintained at that level until the reaction has ended (for about 21 hours), while the volatiles are distilled off continuously. The reaction mixture is then cooled down to 110° C. and filtered. The residue is thoroughly washed with, in succession, dimethylformamide and methanol and is dried at 80° C. in a vacuum drying cabinet. This leaves 2.91 g of a yellow product, which corresponds to a yield of 73% of theory (based on the molecular weight of the asymmetrical compound). The product is a mixture of the three compounds of the formulae

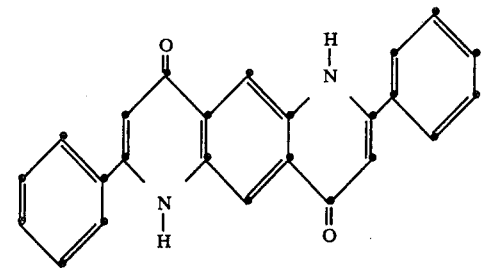
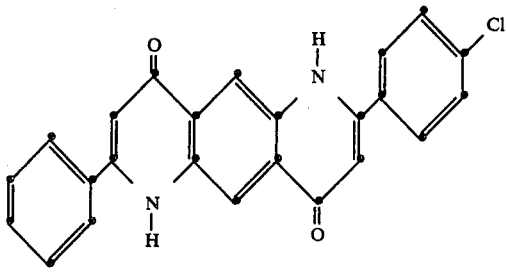
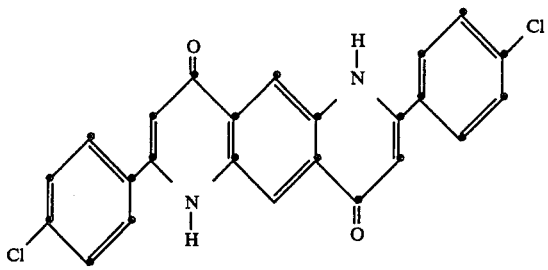

EXAMPLE 20

0.6 g of the product of Example 1 in the form of a 50% polyester formulation are mixed together with 67 g of polyvinyl chloride, 33 g of dioctyl phthalate, 2 g of dibutyltin dilaurate and 2 g of titanium dioxide, and the mixture is processed at 160° C. on a roll mill for 15 minutes to give a thin sheet. The yellow coloration thus produced is strong and migration- and light-fast.

EXAMPLE 21

0.2 g of the product of Example 1, which has been dissolved beforehand in concentrated sulfuric acid and reprecipitated with water and subsequently recrystallized in the same solution under reflux, 1 g of titanium dioxide (rutile) and 100 g of LD polyethylene granulate are mixed in a drum, and the mixture is subsequently processed at 130° C. on mixing rolls. The material is processed to form sheets by hot pressing or moulding in an extruder. The sheets have an attractive yellow colour of good light fastness.

EXAMPLE 22

60 parts of a 60% strength solution of a nondrying alkyd resin in xylene (trade name Beckosol 27-320 from Reichhold-Albert-Chemie), 36 parts of a 50% solution of a melamine-formaldehyde resin in a butanol-xylene mixture (trade name Super-Beckamin 13-501 from Reichhold-Albert-Chemie), 2 parts of xylene and 2 parts of methylcellosolve are mixed, and 100 parts of this mixture are stirred by means of a stirrer to give a homogeneous varnish solution.

95 parts of the varnish thus obtained and 5 parts of the product of Example 11 are ball-milled for 72 hours. The coloured varnish is then applied to sheet metal by a conventional spray method and baked at 120° C. for 30 minutes. A yellow coating of good light fastness is obtained.

What is claimed is:

1. A compound of the formula VII

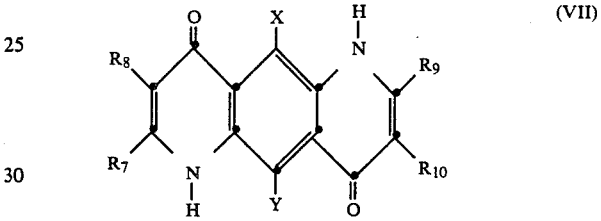

in which one of $R_7$ and $R_8$ and one of $R_9$ and $R_{10}$ are hydrogen and the other two radicals are, independently of each other, unsubstituted biphenyl or naphthyl or $C_1$–$C_{12}$-alkoxy-substituted phenyl, biphenyl or naphthyl or a heterocyclic radical selected from the group consisting of pyridyl, pyrazinyl, triazinyl, furyl, pyrrolyl, thienyl, quinolyl, coumarinyl, indolyl, benzofuranyl, benzimidazolyl and benzoxazolyl, and X and Y are independently of each other hydrogen, halogen or cyano.

2. A compound according to claim 1, of the formula VII in which one of $R_7$ and $R_8$ and one of $R_9$ and $R_{10}$ are hydrogen and the other two radicals are, independently of each other, p-biphenyl or β-naphthyl and X and Y are hydrogen.

3. A compound according to claim 1, of the formula VII in which $R_8$ and $R_{10}$ are hydrogen.

4. A compound according to claim 1, of the formula VII in which $R_8$ and $R_{10}$ are hydrogen, $R_7$ and $R_9$ are identical and are p-biphenyl or β-naphthyl, and X and Y are hydrogen.

* * * * *